US005107681A

United States Patent [19]

Wolfbauer, III

[11] Patent Number: 5,107,681

[45] Date of Patent: Apr. 28, 1992

[54] OLEOPNEUMATIC INTENSIFIER CYLINDER

[75] Inventor: Michael H. Wolfbauer, III, Roseville, Mich.

[73] Assignee: Savair Inc., St. Clair Shores, Mich.

[21] Appl. No.: 566,053

[22] Filed: Aug. 10, 1990

[51] Int. Cl.[5] .......... B60T 13/00

[52] U.S. Cl. .......... 60/547.1; 60/567; 60/578

[58] Field of Search .......... 60/547.1, 567, 574, 60/578, 593

[56] References Cited

U.S. PATENT DOCUMENTS

| | | | |
|---|---|---|---|
| 763,833 | 6/1904 | Albree | 60/578 X |
| 1,007,349 | 10/1911 | Gerdau | 60/567 X |
| 2,032,185 | 2/1936 | Sciaky | 60/567 X |
| 3,426,530 | 2/1969 | Georgelin | 60/560 |
| 3,633,365 | 1/1972 | Belknap | 60/578 X |
| 4,288,987 | 9/1981 | Grullmeier | 60/593 X |
| 4,300,351 | 11/1981 | Grullmeier | 60/593 X |
| 4,961,317 | 10/1990 | Wolfbauer | 60/567 X |

*Primary Examiner*—Edward K. Look
*Assistant Examiner*—John Ryznic
*Attorney, Agent, or Firm*—Remy J. VanOphem

[57] ABSTRACT

An oleopneumatic load intensifier apparatus for creating a rapid advance of a tool carrying rod followed by slow advance of the piston rod at an increased load. The apparatus has a master cylinder and an actuating cylinder that can assume different positions with respect to the master cylinder while maintaining fluid communication therewith. An enclosed hydraulic system is shared by the master and actuating cylinders. Pneumatic pressure actuates a piston within the master cylinder that causes a rapid advancement of a hydraulically fed piston within the actuating cylinder, causing a piston rod and a tool associated therewith to contact a workpiece. Pneumatic pressure then causes a piston and associated piston rod, located in the master cylinder, to increase the hydraulic pressure in the line to the hydraulically fed piston located within the actuating cylinder, thus, increasing the load delivered to the workpiece.

36 Claims, 8 Drawing Sheets

Fig-8A
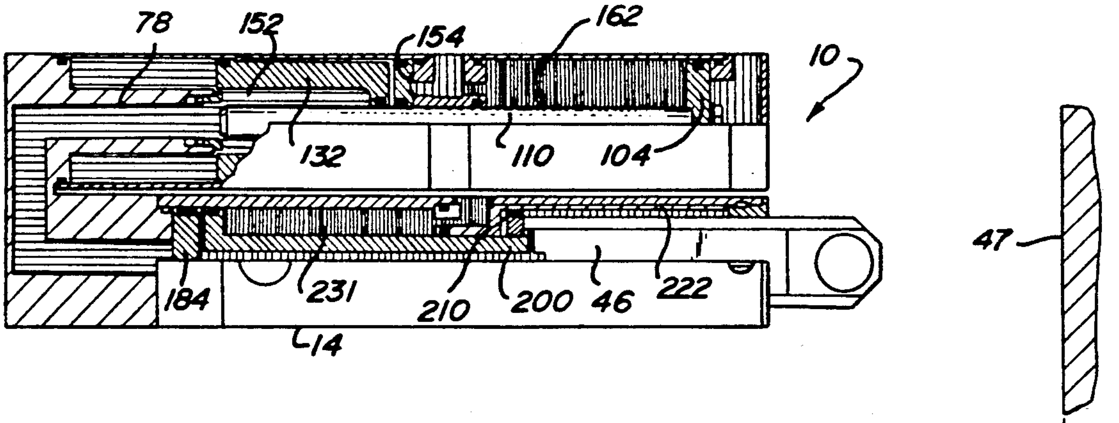
Fig-8B
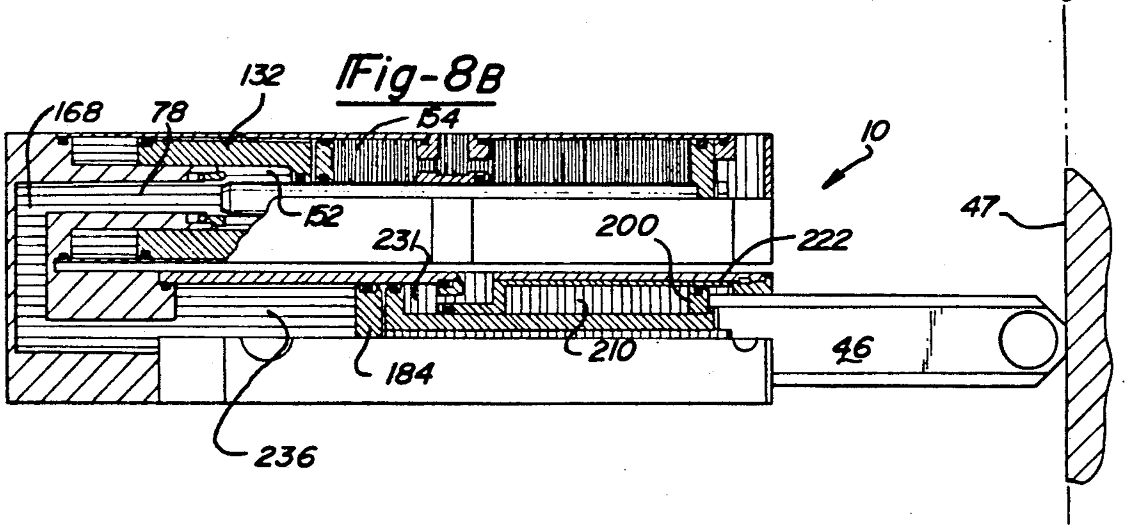
Fig-8C
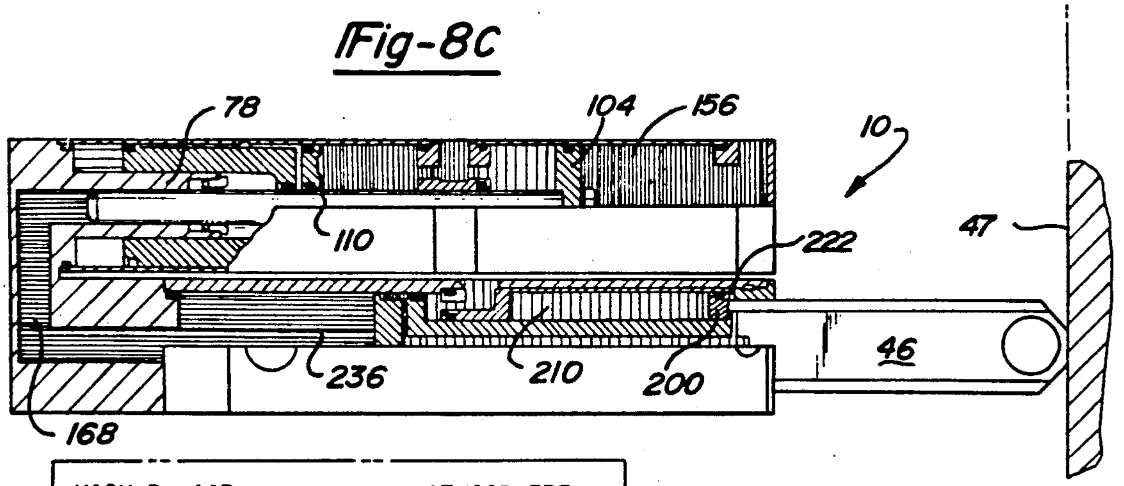
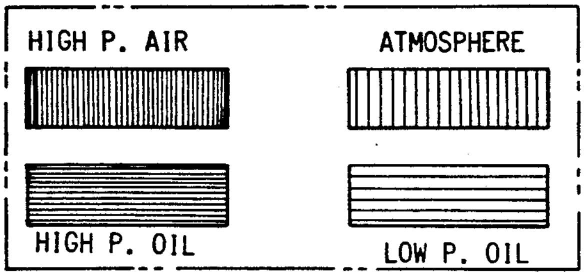
Fig-8D

OLEOPNEUMATIC INTENSIFIER CYLINDER

BACKGROUND OF THE INVENTION

1. Field of the Invention

The present invention relates to a fluid powered apparatus that has application for clamping, punching, welding and other functions that are necessary in the manufacture and assembly of machines and vehicles such as automobiles. More particularly, the invention is related to a dual action fluid powered apparatus designed to implement a rapid movement in approaching a workpiece until contact is effected. The movement of the apparatus upon contact with the workpiece is then transformed to a slow, more powerful working mode.

2. Description of the Prior Art

The prior art reveals a wide variety of fluid powered devices that employ a plurality of cylinder and piston combinations to control the speed and force of the device as an element thereof advances toward a workpiece.

In general, most of the prior art devices utilize a tandem arrangement for the various pistons that are all contained within a single cylindrical housing.

By way of example, the present invention differs from the oleopneumatic jack that is shown and described in U.S. Pat. No. 3,426,530 entitled "Oleopneumatic Jack with Staged Structure" issued Feb. 11, 1969, to Alexander Georgelin. The jack has a cylindrical tubular body structure with end caps attached thereto. A first piston is positioned at one end within the cylindrical body. The piston has attached thereto an elongated hollow plunger that is adapted to move with the piston. A floating piston is positioned so that it slides freely along the previously mentioned hollow plunger. A third piston is positioned near the other end of the cylindrical body. The third piston has coupled thereto, as an integral part, a thrust member that protrudes from the other end of the cylindrical body. The third piston contains a hollow central chamber into which extends a portion of a thrust member. Air pressure is applied to one end of the floating piston thus causing it to urge oil against the third piston which in turn causes the thrust member attached to the third piston to extend from the cylindrical body. After the initial rapid advancement of the third piston and the thrust member, air pressure is introduced behind the first piston. As the first piston moves axially along the interior of the cylindrical body, its attached hollow plunger enters the oil filled hollow central chamber of the third piston thus causing it to move slowly while exerting a large force.

In U.S. Pat. No. 4,099,436 entitled "Apparatus for Piercing Sheet Material" issued Jul. 11, 1978, to Donald Beneteau, there is described a force intensifier that employs an oil reservoir that is external of a cylindrical structure that contains a pair of pistons in axial alignment. The oil in the reservoir is forced into the cylinder by pressurized air that is in direct contact with the oil. The oil that is introduced into the cylinder moves one of the pistons, causing a tool carrying plunger to advance toward a workpiece. In order to intensify the force delivered by the tool carrying plunger, air is introduced behind the other piston, causing it to move an attached plunger into a constricted cavity where the oil pressure is greatly increased, thereby exerting an even greater force on the tool carrying plunger.

One of the disadvantages of the above described apparatus is that its position cannot be readily changed because of the air-oil interface in the reservoir.

An additional load producing cylinder is shown in FIG. 3 of U.S. Pat. No. 4,395,027 entitled "Pressure Intensifying Device" issued Jul. 26, 1983, to Robert Nordmeyer. FIG. 3 of the above referenced patent depicts a cross-sectional view of a pressure intensifying device that has an essentially cylindrical configuration. There is a first piston and plunger combination that moves in the direction towards a second piston plunger combination. The first piston moves under the influence of air pressure and returns to its original position by the biasing action of a compression spring. The second piston is essentially hollow and is filled with oil that supplies the force that causes the second piston and plunger to move linearly. After the second piston has accomplished its initial movement, the first piston plunger is advanced into the oil filled chamber of the second piston. The force on the second piston is thus intensified. The cylinder contains an internally positioned oil reservoir through which the first piston plunger passes. The just mentioned device utilizes, in tandem, pistons that move in the same direction during the initial or advancement movement. One of the inherent drawbacks of the just described device is its overall length. Then, too, the spring that is biased against the first piston subtracts from the overall load that is applied by air pressure.

The present invention does not have an air-oil interface since the oil is self-contained completely within the confinement of the apparatus. In addition, the present invention has a plunger unit that is separable from the load enhancement plunger.

The present invention does not utilize springs to aid in the movement of the pistons. Also, the present invention is not arranged in a continuous linear array as is the device described in U.S. Pat. No. 4,395,027.

SUMMARY OF THE PRESENT INVENTION

The present invention is a load intensifier apparatus for use in any application where a linear force of considerable magnitude is required such as in metal shaping, punching, clamping, and welding.

The invention includes a two part housing wherein the second portion of the housing can be arranged at any attitude with respect to the first portion of the housing. The first portion of the housing contains an enclosed oil reservoir that is in communication with the second housing. The first portion of the housing contains a floating piston that moves along the piston rod of an intensifier piston. The second portion of the housing contains a piston and a piston rod that extends from the housing. In the first housing, air pressure is introduced to one side of the floating piston causing a volume of oil located on the other side of the floating piston to move into the second portion of the housing where its pressure causes the piston within the second portion of the housing to undergo rapid movement to advance the attached piston rod toward a workpiece. After the rapid movement of the piston in the second portion of the housing has occurred, the pressure intensifier piston within the first portion of the housing is moved under the influence of air pressure. The end of the piston rod of the intensifier piston then enters a constricted oil passageway causing a slow but intense movement of the piston in the second portion of the housing. The further movement of the piston in the second portion of the housing causes its piston rod to additionally bias itself against the workpiece.

A primary object of the present invention is to provide a force intensifier apparatus that is compact and can function with a variety of tools attached thereto.

Another object of the present invention is to provide an apparatus that utilizes two separable housings so that the apparatus can be employed in confined spaces.

A further object of the present invention is to provide an apparatus wherein the externally applied motivating force is pneumatic utilizing a retardant fluid.

Another object of the present invention is to provide an apparatus that contains a completely enclosed hydraulic circuit which will properly operate in any degree of orientation with reference to gravity.

Still another object of the present invention is to provide two distinct housing portions located at selectively spaced apart locations, each of which lends itself to rapid replacement and repair.

A further object of the present invention is to minimize the axial length of the overall device and thereby conserve space.

A yet further object of the present invention is to provide an apparatus that utilizes, initially, a fast stroke followed by a low impact stroke to contact the workpiece and rapid pressure build up to hold the workpiece.

Another object of the present invention is to provide an electronic capability to detect if the hydraulic oil needs replenishing and allow refilling, if needed, without removing the unit from the machine.

Still another object of the present invention is to provide an apparatus which utilizes one valve to operate forward stroke, intensifier stroke and return stroke thereby keeping the cycle time to a minimum.

A further object of the present invention is to provide an apparatus that has a load cell to indicate the position of work and to display the pressure holding the workpiece while not experiencing any impact loads on the load cell.

Still a further object of the present invention is to reduce the overall length of the apparatus by incorporating special structure into the end cap of the apparatus resulting in a more leak-proof, efficient communication between the master cylinder and the actuating cylinder, utilization of fewer parts, as well as permitting selective orientation of the actuating cylinder.

Another object of the present invention is to provide an apparatus that provides an intermediate retract position for reducing the cycle time during multiple weld operations.

Further objects and advantages of the present invention will become apparent from the following description and the appended claims, reference being made to the accompanying drawings forming a part of this specification, wherein like reference characters designate corresponding parts in several views.

BRIEF DESCRIPTION OF THE DRAWINGS

FIG. 8A is a cross-sectional view that shows the position of the pistons and piston rods in the fully retracted position;

FIG. 8B is a cross-sectional view that shows the position of the pistons and piston rods after pressure has been applied to the reservoir piston;

FIG. 8C is a cross-sectional view similar to that shown in FIGS. 8A and 8B except that intensification has occurred;

FIG. 8D is a legend to the fluid pressures indicated in FIGS. 8A through 8C and FIGS. 13A and 13D;

DETAILED DESCRIPTION OF THE PREFERRED EMBODIMENT

Figure 1:
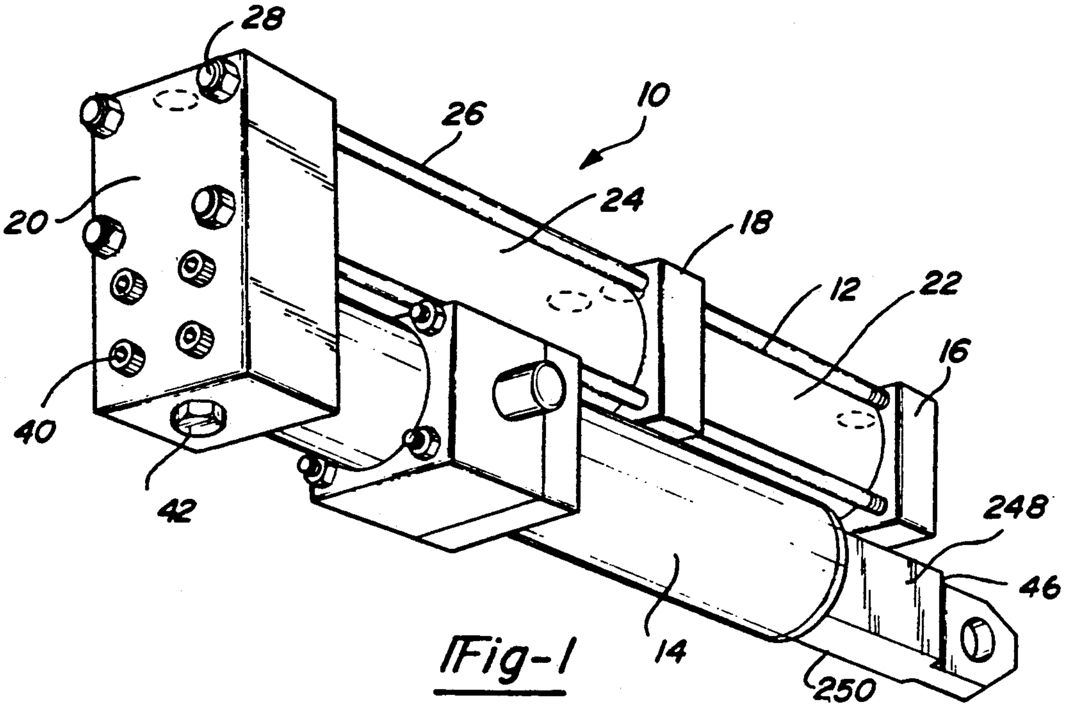
FIG. 1 is a perspective view that shows a preferred embodiment of the force intensifier of the present invention.

Referring now to the drawings and more particularly to FIG. 1, there is illustrated in perspective one configuration of the present load intensification apparatus. The overall apparatus is identified by the numeral 10. The overall apparatus 10 has two distinct subassemblies or housings which shall hereinafter be identified as the master cylinder 12 and the actuating cylinder 14. The master cylinder 12 is essentially a hollow structure with a first or front manifold 16, a second or center manifold 18, and an end cap 20 that are in spaced apart, axially aligned relationship to one another. A cylindrically shaped thin-walled front sleeve 22 is positioned between the front manifold 16 and the center manifold 18. A similar cylindrically shaped rear sleeve 24 is positioned between the center manifold 18 and the end cap 20. The master cylinder 12 is held together by studs 26 that pass through each one of the manifolds 16 and 18 and the end cap 20. The studs 26 are threaded on each end and tension thereon is maintained by threaded nuts 28.

Figure 7:
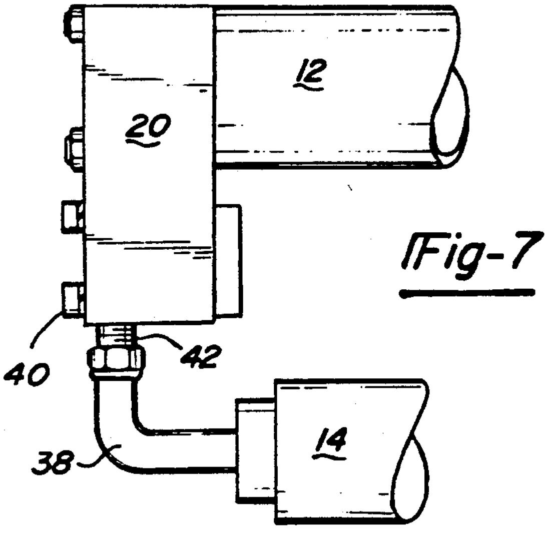
FIG. 7 shows an alternative embodiment with the actuating cylinder in fluidic communication with the master cylinder by an external fluid connection to the end cap.
Figure 10:
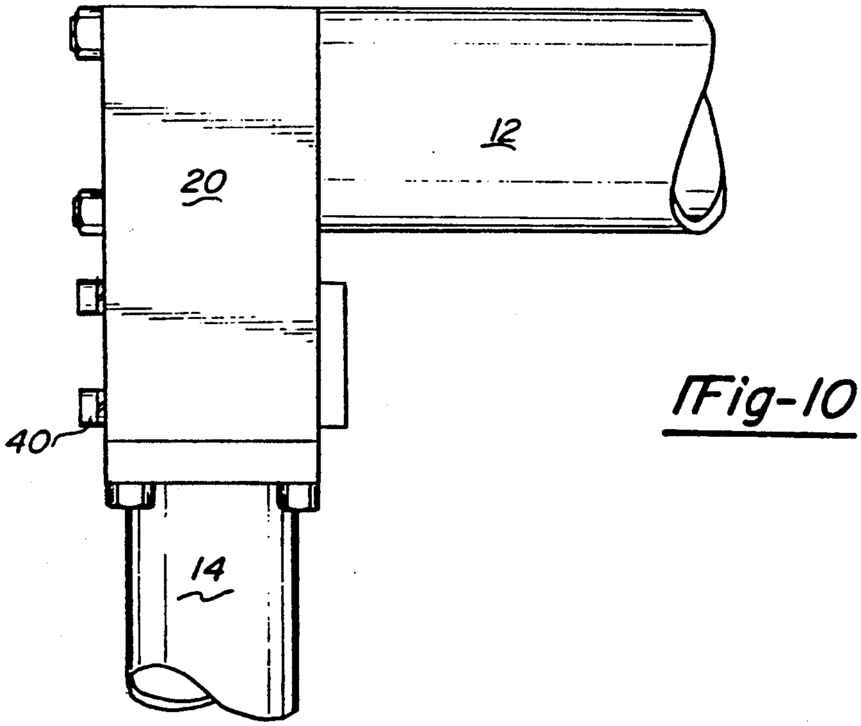
FIG. 10 shows an alternate mounting arrangement with the actuating cylinder directly mounted to the master cylinder auxiliary port.

The actuating cylinder 14 is cylindrical throughout its internal and external configuration. As shown in the preferred embodiment of FIG. 1, the actuating cylinder 14 is directly mounted to the end cap 20 with threaded fasteners 40. While the actuating cylinder 14 is shown in a parallel attitude with respect to the master cylinder 12, it is readily understood that the orientation and positioning of the actuating cylinder 14 can be altered to fit any particular application by providing an auxiliary port 42 to the end cap 20. A fluidic connection 38 can then be used between the master cylinder 12 and the actuating cylinder 14, as shown as an alternative embodiment in FIG. 7. Further, if desired, the actuating cylinder 14 may be mounted directly to the end cap's 20 auxiliary port 42 for a 90° direct mounting configuration as shown in FIG. 10. Additionally, it is readily understood that this embodiment allows a single master cylinder 12 to control any desired number of actuating cylinders 14 in series or in parallel connection. Accordingly, the master cylinder 12 should be proportionally sized for the particular application.

Figure 5:
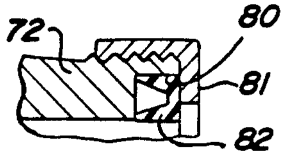
FIG. 5 is a cross-sectional view showing the intensifier cap seal arrangement depicted in circle 5 of FIG. 3.
Figure 3:
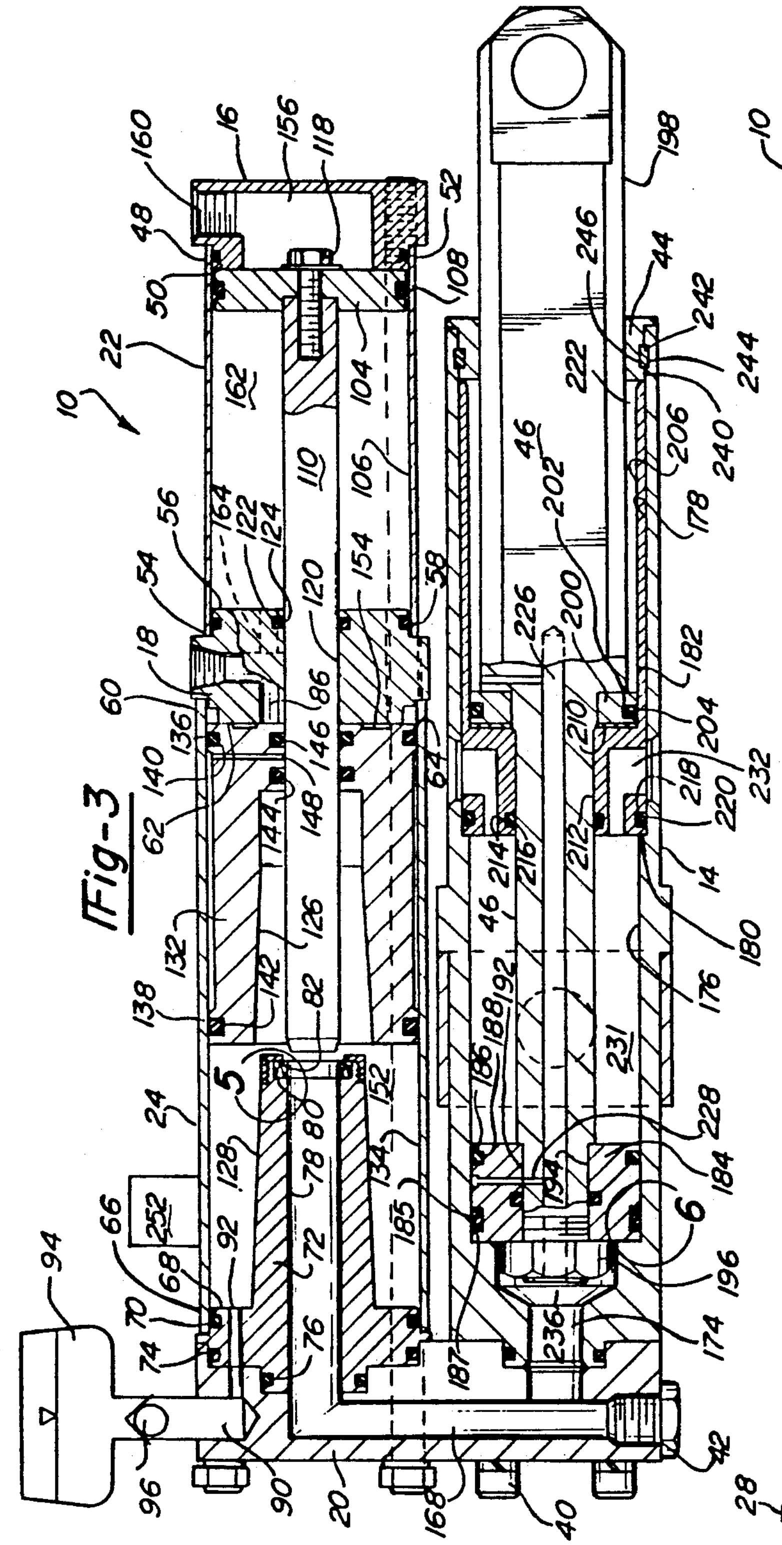
FIG. 3 is a cross-sectional view taken along section line 3-3 of FIG. 2 showing the cylinders and pistons and their interrelationship to one another.
Figure 2:
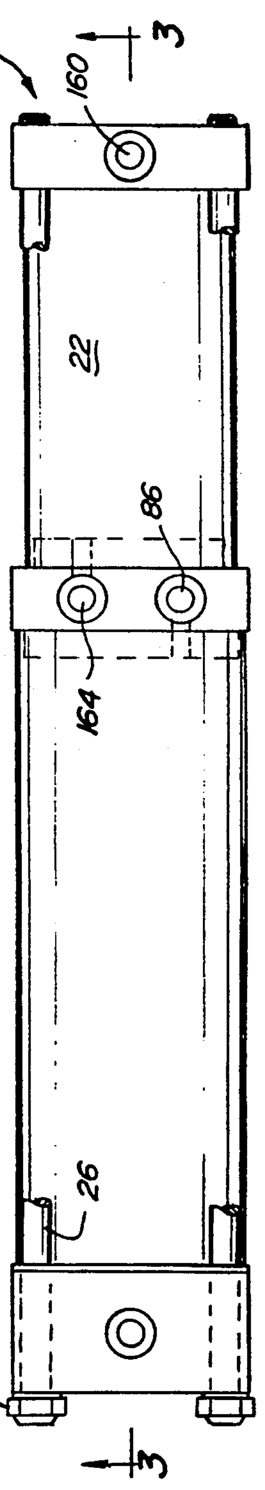
FIG. 2 is a top view of the preferred embodiment of FIG. 1.

FIG. 3 is a cross-sectional view of the overall apparatus 10 that is depicted in FIG. 1. FIG. 3 shows the pistons and their interrelationship to one another in an at rest condition. The front sleeve 22 may, if desired, have the same overall dimensions as the rear sleeve 24. The front and rear sleeves 22 and 24 are preferably manufactured from steel. The leading end 48 of the front sleeve 22 fits over a machined boss 50 on the front manifold 16. Even though close tolerances are maintained between the inside diameter of the front sleeve 22 and the outside diameter of the boss 50, it is desirable to utilize an O-ring 52 for sealing purposes. The trailing end 54 of the front sleeve 22 fits over a machined boss 56 on the center manifold 18. An O-ring 58 is utilized between the machined boss 56 and the interface with the front sleeve 22 to ensure a fluid tight joint. The leading end 60 of the rear sleeve 24 fits over a machined boss 62 on the center manifold 18. An O-ring 64 is positioned so that it effects a fluid tight seal between the inside surface of the rear sleeve 24 and the machined boss 62. The trailing end 66 of the rear sleeve 24 fits over a machined boss 68 on a third or an annular manifold member 72. An O-ring 70 is used to ensure a fluid tight seal between the inside surface of the rear sleeve 24 and the machined boss 68. The end cap 20 is attached to the trailing end of the annular manifold member 72. A first O-ring 74 ensures a fluid tight seal between the perimeter of the annular manifold member 72 and the end cap 20. A second O-ring 76 is utilized to maintain a fluid tight seal between a reduced portion of the annular manifold member 72 and the end cap 20. The annular manifold member 72 has a bore 78 that contains a groove 80 therein for an elastomeric seal 82 retained by a retainer cap 81, as best illustrated in FIG. 5. The purpose of the reduced diameter bore 78 will be discussed in more detail below.

An intensifier piston 104 is positioned within a bore 106 in the front sleeve 22. The intensifier piston 104 is sealed against the bore 106 by means of an O-ring 108. An intensifier piston rod 110 is centrally attached to the intensifier piston 104 by a threaded fastener 118. The intensifier piston rod 110 passes through a bore 120 that is located in the center manifold 18. A groove 122 within the bore 120 carries an O-ring 124 provided as a seal between the center manifold 18 and the intensifier piston rod 110.

An annular-shaped floating reservoir piston 132 is positioned over the intensifier piston rod 110. A portion of an inner surface 126 of the floating reservoir piston 132 is elongated and tapered to closely mate with a frustoconically shaped portion 128 of the annular manifold member 72. The reservoir piston 132 is positioned within a bore 134 within the rear sleeve 24. The floating reservoir piston 132 is sealed against the surface of the bore 134 by means of a leading end O-ring 136 and a trailing end O-ring 138, located in grooves 140 and 142, respectively, in the floating reservoir piston 132. The floating reservoir piston 132 is also sealed against the intensifier piston rod 110 along which it slides by O-rings 144 and 146 which seal the floating reservoir piston 132 against the intensifier piston rod 110 on opposite sides of a relief passage 148 within the floating reservoir piston 132. The relief passage 148 places the area between the leading and trailing end O-rings 136 and 138 on the perimeter of the floating reservoir piston 132 and the area between the O-rings 144 and 146 adjacent the intensifier piston rod 110 in fluid communication, thus preventing the build up of residual pressure between the leading and trailing end O-rings on the floating reservoir piston 132. The arrangement of the floating reservoir piston 132 on the intensifier piston rod 110 within the rear sleeve creates two fluid chambers 152 and 154 within the area of the rear sleeve 24. The fluid chamber 152 lies between the annular manifold member 72 and the internal surface 126 of the floating reservoir piston 132. The fluid chamber 154 lies between the center manifold 18 and a recess in the leading face of the floating reservoir piston 132.

The front manifold 16 contains a fluid chamber 156 and a threaded bore 160. An additional fluid chamber 162 lies between the intensifier piston 104 and the center manifold 18. The center manifold 18 contains a first bore or port 86 that is in communication with the chamber 154. A second bore or port 164 is in communication with the additional fluid chamber 162. The end cap 20 contains a bore 168 that is in communication with the chamber 152 through the reduced diameter bore 78 in the annular manifold member 72. In addition, the end cap 20 has a supply port 90 which is also in fluidic communication with the chamber 152 via a supply passage 92 in the annular manifold member 72. A reservoir 94, positioned in any convenient location, is fluidically connected to the supply port 90 for purposes of supplying the chamber 152 with hydraulic fluid. A one-way check valve 96 is positioned between the reservoir 94 and the supply port 90 to allow fluid to be supplied to the chamber 152 and also to prevent backflow from the chamber 152 to the reservoir 94.

The actuating cylinder 14 has an external cylindrical configuration over its axial extent. The rear portion of the actuating cylinder 14 has a bore 174 that is threaded (not shown) for communication with the bore 168 of the end cap 20. The interior of the actuating cylinder 14 is formed by an axial bore 176 that extends over approximately the rear one half of the actuating cylinder 14. The remaining or forward one half of the interior of the actuating cylinder 14 is formed by an axially extending bore 178 that is of greater diameter than the axial bore 176 of the rear half of the actuating cylinder. A radially extending shoulder 180 forms the intersection between the bores 176 and 178. A sleeve 182 is positioned within the bore 178 of the actuating cylinder 14. The shoulder 180 acts as a stop for the sleeve 182 thus defining its axial position within the actuating cylinder 14.

Figure 6:
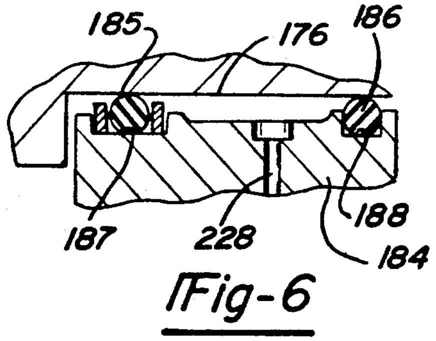
FIG. 6 is a cross-sectional view showing the positions of the O-ring and backup ring arrangement of the actuating cylinder detailed in circle 6 of FIG. 3.

A rear piston 184 is positioned within the bore 176. The rear piston 184 has a first O-ring seal and backup rings 185 positioned within a groove 187, and a second O-ring seal 186 positioned within a groove 188 located in the cylindrical exterior surface of the rear piston 184 as more clearly shown in FIG. 6. A piston rod 46 has one end thereof attached to the rear piston 184. The piston rod 46 has a reduced diameter end 192 with a threaded portion (not shown) that extends through an axially aligned bore 194 in the rear piston 184. The rear piston 184 is attached to the piston rod 46 by means of a threaded nut 196 that engages the threaded portion threads (not shown) on the end of the reduced diameter end 192 of the piston rod 46. The piston rod 46 extends from the rear piston 184 through the entire axial extent to the right, as viewed in FIG. 3, where it exits the actuating cylinder 14 as an unencumbered cantilevered end 198.

Returning once again to the actuating cylinder 14, a forward piston 200 is press fit onto the piston rod 46. The forward piston 200 is located generally toward the mid-portion of the axial extent of the piston rod 46. The forward piston 200 has a peripheral groove 202 that contains an O-ring 204. The sleeve 182 accommodates the forward piston 200 within a bore 206 of the sleeve 182. The O-ring 204 seats against the surface of the bore 206. The sleeve 182 contains a second bore 212 that permits the piston rod 46 to pass therethrough, forming a chamber 210 between the forward piston 200 and the shoulder formed between the bore 206 and the second bore 212. The second bore 212 contains a groove 214 in which an O-ring 216 is positioned for providing a seal between the sleeve 182 and the piston rod 46. The sleeve 182 contains a groove 218 positioned in its external surface so that an O-ring 220 can be placed therein to effect a seal between the sleeve 182 and the bore 178 of the actuating cylinder 14. The section of the piston rod 46 located to the right of the forward piston 200, as viewed in FIG. 3, has a diameter that is less than the bore 206 of the sleeve 182, thus forming a chamber 222. The chamber 222 is in communication with a central bore 226 through the rear portion of the piston rod 46 by way of a radial passage in the piston rod 46. In a similar manner, the rear piston 184 has a radial bore 228 extending between the O-ring seals 185 and 186 that is in communication with the central bore 226. A chamber 231, which is positioned to the right of the rear piston 184, is in communication with a passage 232 in the sleeve 182. A chamber 236, located to the left of the rear piston 184 as viewed in FIG. 3, is in communication with the fluid chamber 152 of the master cylinder 12 via the bore 174 of the actuating cylinder 14, the passage 168 in the end cap 20, and the bore 78 in the annular manifold member 72.

A retaining bushing 44 is mounted to the forward portion of the actuating cylinder 14 and has an external part cylindrical section 240 that fits into the bore 178 to establish the chamber 222. The retaining bushing 44 is immobilized by means of a retaining ring 242 that coacts with a groove 244 in the wall of the bore 178 in the actuating cylinder 14 and with a groove 246 that is milled in the external surface of the external part cylindrical section 240.

As can be better seen in FIG. 1, the piston rod 46 contains a milled planar area 248 on one side and a similar milled planar area 250 on the other side thereof which is optional. The purpose of the milled planar areas 248 and 250 is to provide orientation to the piston rod 46 so that it will not rotate and cause misalignment with a nonsymmetrical tool that may be affixed to the cantilevered end 198 of the piston rod 46.

Figure 4:
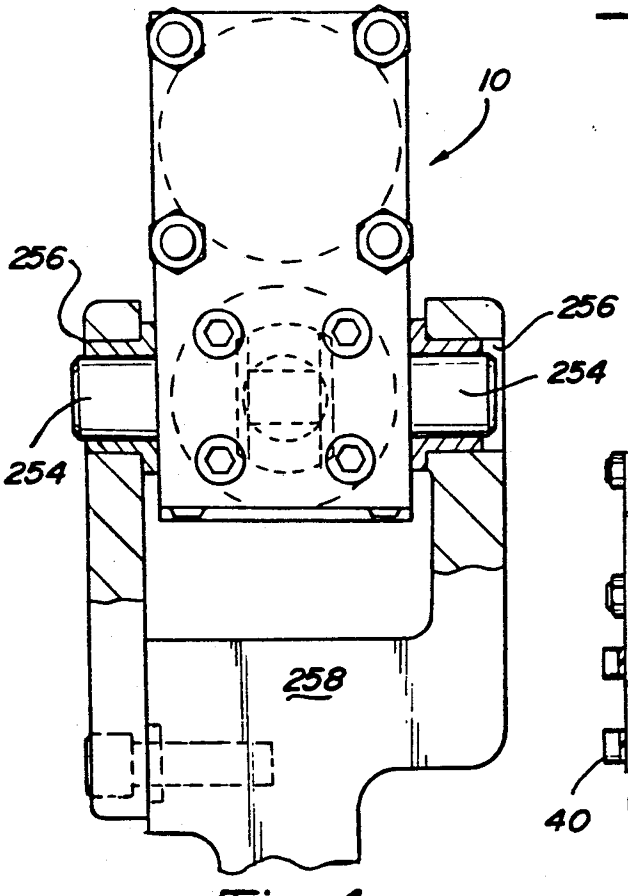
FIG. 4 is a part sectional view of the preferred embodiment of FIG. 1 as mounted to a mounting bracket.

FIG. 4 is a part sectional view of an embodiment that employs a trunnion 254 as an integral part of the actuating cylinder 14. FIG. 4 shows the trunnion 254 engaged with mounting slots 256 within a mounting bracket 258. This arrangement allows the actuating cylinder 14 to be pivoted to the preferred attitude for a particular application.

Figure 9:
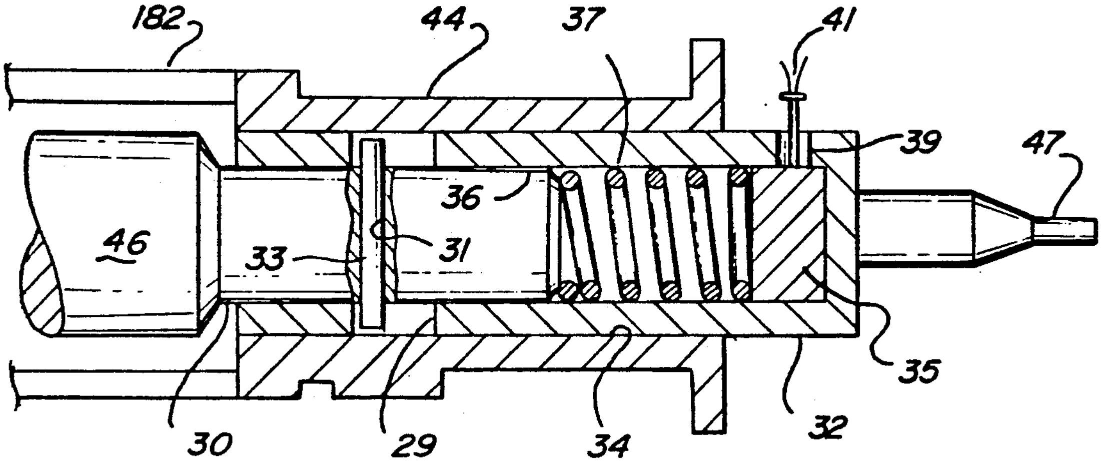
FIG. 9 is a part sectional view of an embodiment that employs a load cell near the end of the working piston rod.

FIG. 9 is a part sectional view of an embodiment that employs a load cell device within the piston rod 46 of the actuating cylinder 14. FIG. 9 shows the sleeve 182, the piston rod 46 and the retaining bushing 44 similar to like components shown in FIG. 3. The piston rod 46 has a reduced diameter cylindrical section 30. The reduced diameter cylindrical section 30 telescopes within a piston rod adapter 32. The piston rod adapter 32 has an external cylindrical surface that fits within a bore 34 in the retaining bushing 44. The piston rod adapter 32 has an internal bore 36 into which the telescoping end of the piston rod 46 fits. A load cell 35 is positioned within the bore 36 and a compression spring 37 is aligned within the bore 36 between the end of the piston rod 46 and the load cell 35. In order to retain the piston rod adapter 32 on the end of the piston rod 46, a pin 33 is installed in a bore 31 that is diametrically aligned with respect to the piston rod 46. The pin 33 protrudes beyond the external surface of the reduced diameter cylindrical section 30. The ends of the pin 33 fit into slots 29 that are milled into the piston rod adapter 32. In this manner, the piston rod adapter 32 has a limited degree of axial movement with respect to the piston rod 46. The piston rod adapter 32 has a radially aligned bore 39 that permits electrical lead wires 41 of the load cell 35 to exit the interior of the piston rod adapter 32. During operation of the overall apparatus the piston rod 46 causes the compression spring 37 to exert a force on the load cell 35. After the load has been released from the load cell, the compression spring 37 will cause the piston rod adapter 32 to move axially subject to the constraints of the pin 33 and the slots 29.

ASSEMBLY AND OPERATION

During the assembly of the overall apparatus 10, great care must be taken to preserve the integrity of the seals, particularly the O-rings which are subject to the nicks caused by assembly. The master cylinder is assembled by installing the appropriate seals on the reservoir piston 132 and the intensifier piston 104. The intensifier piston 104 is affixed to the end of the intensifier piston rod 110 by the threaded fastener 118. The intensifier piston rod 110 is then inserted through the bore 120 in the center manifold 18. The reservoir piston 132 is then slid over the free end of the intensifier piston rod 110. The front and rear sleeves 22 and 24 are then installed over the respective bosses 56 and 62 on the center manifold 18. The front manifold 16 and the annular manifold member 72 are then positioned so that their respective bosses 50 and 68 slide within the ends of the front and rear sleeves 22 and 24. The end cap 20 is then positioned against the annular manifold member 72, aligning the bore 168 with the reduced diameter bore 78 and the supply port 90 with the supply passage 92. The four studs 26 are then installed in the holes (not shown) within the front and center manifolds 16 and 18 and the end cap 20. The studs 26 are then tensioned by the installation of the nuts 28.

During the assembly of the actuating cylinder 14, the forward piston 200 is press fit onto the piston rod 46 as seen in FIG. 3, the fit being an interference fit. The sleeve 182 is then positioned over the left end (as viewed in FIG. 3) of the piston rod 46. Next, the rear piston 184 is affixed to the end of the piston rod 46 by the nut 196. The rear piston 184, the piston rod 46 and the sleeve 182 are installed within the bores 176 and 178 of the actuating cylinder 14. The retaining bushing 44 is then slid over the cantilevered or free end 198 of the piston rod 46. The retaining bushing 44 is then moved into locking arrangement with the retaining ring 242. The actuating cylinder 14 is then mounted to the end cap 20 with the threaded fasteners 40.

FIG. 8A is a cross-sectional view that shows the position of the pistons and piston rods when the overall apparatus 10 is in the fully retracted position. At the commencement of a cycle of the overall apparatus 10, the intensifier piston 104 is held to the extreme right end of the chamber 162 by high air pressure, as shown, through the bore 120 and its external port. Consequently, the end of the intensifier piston rod 110 is retracted to a position outside of the bore 78 permitting the fluid chamber 152 to communicate with the bore 78. The reservoir piston 132 is to the extreme right end of travel against the center manifold 18. In the actuating cylinder 14 portion of the overall apparatus 10, the rear piston 184 is positioned toward the extreme left toward the end cap 20 defining the greatest extent of the chamber 231, therefore, the extreme right free end of the piston rod 46 is almost entirely retracted within the confinement of the actuating cylinder 14. The forward piston 200, acting as an integral part of the piston rod 46, is positioned against the shoulder defined by the bores 212 and 206.

FIG. 8B is a cross-sectional view that shows the position of the pistons and piston rods after the overall apparatus 10 has been actuated to begin a work cycle. Air pressure is introduced to the fluid chamber 154 through the first bore 86 causing the reservoir piston 132 to move toward the left. The oil to the left of the reservoir piston 132 begins to exit the fluid chamber 152 and, being prevented from returning to the reservoir 94 by the check valve 96, travels via the reduced diameter bore 78 and the bore 168 into the chamber 236. The increase in volume of oil in the chamber 236 causes the rear piston 184 to move rapidly to the right. As the rear piston moves toward the right, air is exhausted from the chamber 231 through the passage 232. Since the forward piston 200 acts as a part of the piston rod 46, the forward piston 200 also moves toward the right thus causing an ingress of atmospheric air into the chamber 210 and an egress of atmospheric air from the chamber 222. After the initial introduction of air pressure to the fluid chamber 154 at the right of the reservoir piston 132 there is a rapid deployment of the piston rod 46 to the right where its travel is halted by an interception with, for example, a workpiece 47.

It has been determined through experimentation that performance characteristics may be diminished if the forward piston 200 is driven toward the right by introducing air pressure into the chamber 210 during the commencement of the cycle illustrated in FIG. 8B. The cause for this loss in performance is believed to be the result of a "sucking action" created when the forward piston 200, as a result of air pressure introduced into the chamber 210, begins to travel before or travels at a faster rate than the reservoir piston 132, thereby forming a partial vacuum in the chamber 236. This in turn provides an additional force that compels the reservoir piston 132 to travel to the left faster than intended by the action of the air pressure in the fluid chamber 154.

FIG. 8C is a cross-sectional view similar to that shown in FIGS. 8A and 8B that shows the final stage of the work cycle of the overall apparatus 10. Since rapid deployment of the piston rod 46 has brought a tool (not shown) carried by it into contact with the workpiece 47, the load must be increased beyond the capability of the air pressure normally found at an industrial site. Consequently, air pressure is introduced into the chamber 156 which is positioned to the right of the intensifier piston 104. As the intensifier piston 104 moves to the left, the tip of the intensifier piston rod 110 enters the bore 78 in the annular manifold member 72, causing the oil trapped before it to act as a closed loop system between the intensifier piston rod 110, the bore 78, and the chamber 236. The continued travel of the intensifier piston rod 110 into the bore 78 acts on the oil in the chamber 236 urging the rear piston 184 to the right, delivering a greatly increased or intensified force to the piston rod 46. The actual movement of the piston rod 46 has been exaggerated in FIG. 8C for purposes of illustrating the movement thereof. The increased movement of the forward piston 200 to the right will exhaust additional atmospheric air from the chamber 222 and cause an influx of additional atmospheric air into the chamber 210. Thus, there will be a combined hydraulic intensifying force introduced to the piston rod 46.

On the return stroke, both the intensifier piston 104 and the rear piston 184 are driven back to their original positions by introducing high pressure air into their respective chambers 162 and 231 through the bore 164 and the passage 231. The return stroke of the rear piston 184 acts to return the reservoir piston 132 to its original position to the right end of the fluid chamber 152 against the center manifold.

As an added feature to ensure adequate performance of the apparatus 10, there is provided a proximity sensor 252 for sensing the position of the reservoir piston 132 in relation to the extreme left end of the fluid chamber 152. As shown in FIG. 3, the proximity sensor 252 is located adjacent the extreme left end of the fluid chamber 152 and can be instrumented through any conventional means to relay a warning signal when the reservoir piston 132 is approaching the end of its stroke capability within the fluid chamber 152. This condition would arise if, for example, the hydraulic fluid within the fluid chamber 152 has dropped to an unacceptable level. By way of a warning signal, an operator of the apparatus 10 is put on notice that replenishment of the hydraulic system is necessary.

Figure 11:
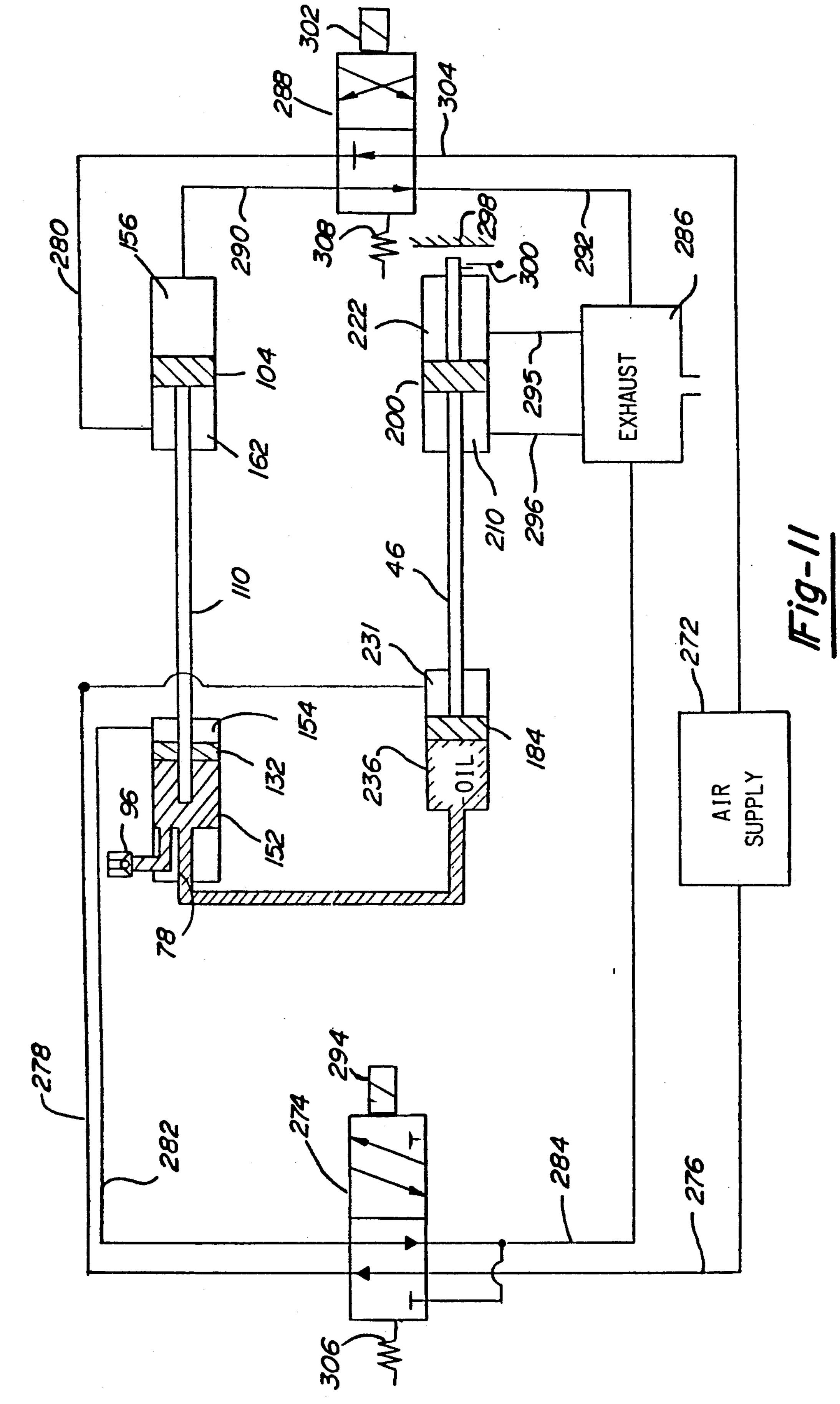
FIG. 11 is a schematic view that shows the valving system utilized with the present apparatus.

FIG. 11 is a schematic fluid diagram according to the present invention and the controls that achieve the fluid motion. For purposes of the present invention the fluids have been described as air and oil. FIG. 11 shows a simplified layout of the pistons and piston rods. Since the oil within the overall apparatus 10 is self-contained, the oil has been shown for clarity as section lines. In order to operate the overall apparatus through its entire work cycle, only external air pressure need be applied. For purposes of explanation, it is assumed the overall apparatus 10 is coupled to an air supply 272. Air under pressure is supplied to a three-way valve mechanism 274 which is a solenoid actuated spring return device. The air under pressure exits the air supply through a line 276 and travels through the three-way valve mechanism 274 to a line 278 and to the chamber 231. The air supply 272 also supplies air under pressure to a line 304 which is connected to a two-way valve mechanism 288 which supplies air under pressure to the chamber 162. The air pressure supplied to the chamber 231 causes the rear piston 184 to move to the left as viewed in FIG. 8A forcing the oil from the chamber 236 into the fluid chamber 152 and urging the floating reservoir piston 132 to the right. As the floating reservoir piston 132 moves to the right, air is exhausted from the fluid chamber 154 through a line 282 to the valve mechanism 274 which permits the expelled air to enter a line 284 and travel to an exhaust port 286 which may, if desired, be a device such as a muffler to attenuate the noise level of the exhausting air. The air pressure delivered via a line 280 to the chamber 162 causes the intensifier piston 104 to remain to the right, ensuring that the tip of the intensifier piston rod 110 does not impede the flow of oil into the fluid chamber 152. The chamber 156 is connected to the two-way valve mechanism 288 by a line 290. In the unenergized position, the two-way valve mechanism 288 permits pressurized air in the chamber 156 to exhaust through the line 290 to a line 292 and pass to the exhaust port 286. At the start of the cycle, a solenoid 294 on the normally open three-way valve mechanism 274 is energized by the movement of a workpiece into a work station or by other means that connects to an electrical source to the solenoid. The energizing of the solenoid 294 connects the air supply line 276 to the line 282 pressurizing the fluid chamber 154 through the port in the manifold 18 through the first bore 86 which causes the floating reservoir piston 132 to move to the left, forcing oil from the fluid chamber 152 into the chamber 236. Oil entering the chamber 236 causes the rear piston 184 to move rapidly to the right, hence the piston rod 46 moves to the right along with the forward piston 200. The energizing of the solenoid 294 on the three-way valve mechanism 274 also causes the air supply line 278 to the chamber 231 to become connected to the exhaust line 284. As the forward piston 200 moves to the right, air is exhausted from the chamber 222 through a line 295 and air from the exhaust port 286 is drawn through a line 296 to the chamber 210. After the piston rod 46 has made its rapid advance toward and against a workpiece such as is identified by numeral 298, the pressure, or an electrical sensing switch such as 300, energizes a solenoid 302 on the normally closed two-way valve mechanism 288 causing the line 304 to be switched from its connection to line 280 to be reversed and be connected to the line 290 and at the same time the line 280 is switched to be connected to the exhaust line 292. The air pressure delivered by the line 290 to the chamber 156 causes the intensifier piston 104 to move to the left thus permitting the tip of the intensifier piston rod 110 to enter the bore 78 and apply an intensified pressure on the oil in the chamber 236. The increased force supplied to the rear piston 184 is transferred to the piston rod 46 and to the workpiece 298. At the command of an operator or by automatic timing, the solenoids 294 and 302 are deenergized, permitting springs 306 and 308 to return the valve mechanisms 274 and 288 to their original starting positions. It is to be noted that by utilizing air to hold the intensifier piston positively in place while the floating reservoir piston is subjected to air pressure avoids the need for using springs and results in a more positive control of the intensifier piston. It is also to be noted that appropriate bleed passages are provided, as is customary in the art, between cooperating seals to prevent the buildup of residual pressures due to blowby.

By way of illustration, the intensifier piston rod 110 has a diameter of 0.5 inches and the intensifier and rear pistons 104 and 184 each have a diameter of 1.75 inches. The increase in the pressure delivered to the rear piston 184 varies as the square of the diameter, 1.75 squared divided by 0.5 squared yields a pressure increase of 12.25. Thus, if typical shop air at 80 p.s.i. is delivered to the intensifier piston, there will be 980 p.s.i. delivered to the rear piston 184.

Figure 12:
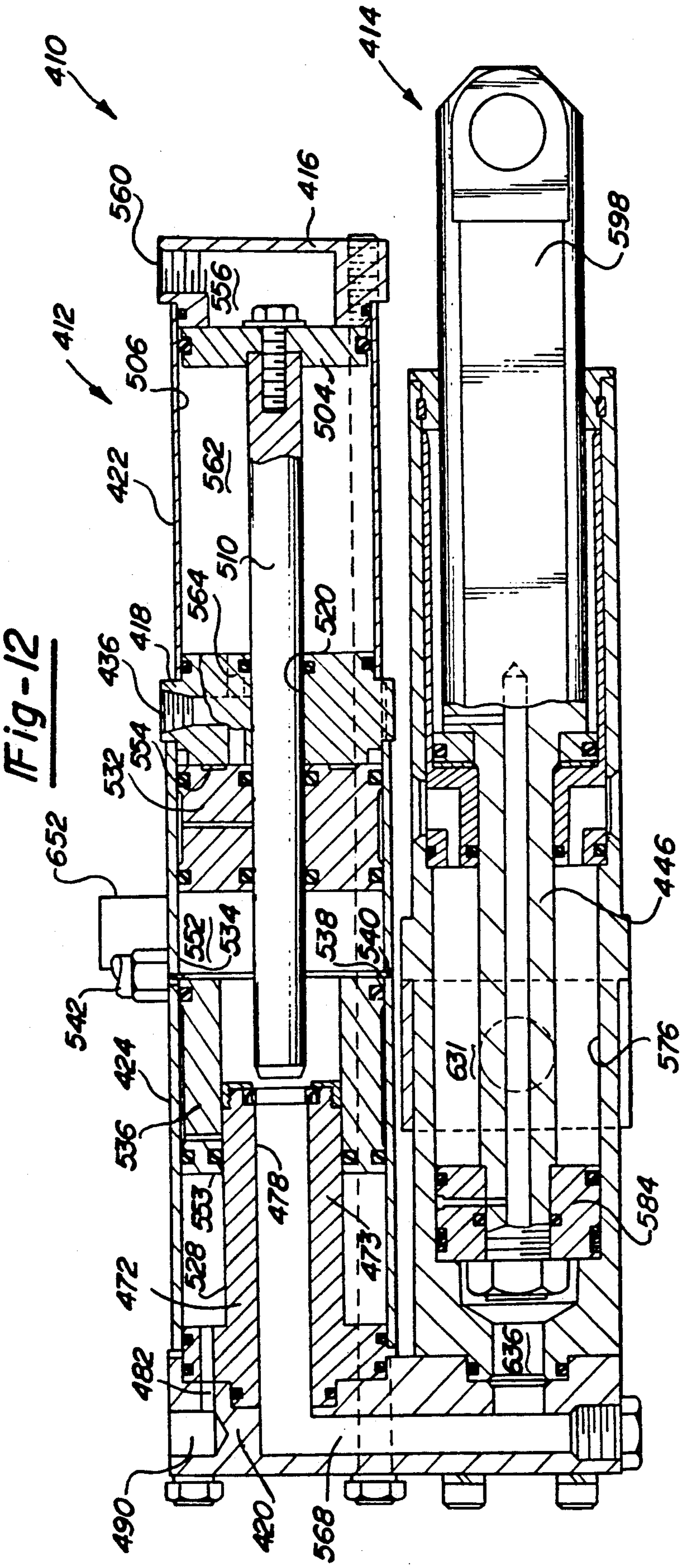
FIG. 12 is a cross-sectional view of a second embodiment of the invention showing the cylinders and pistons and their interrelationship to one another.

In a second embodiment of the present invention, FIG. 12 illustrates a load intensification apparatus identified by numeral 410. The load intensification apparatus 410 of the second embodiment is distinguished from the load intensification apparatus 10 of the first embodiment by the provision of an intermediate retract position capability. As will be readily seen, the intermediate retract position facilitates multiple weld operations by reducing the cycle time between successive welds which do not require the full clearance provided by the full retract position of the overall apparatus 10.

In a manner similar to the first embodiment, FIG. 12 shows the overall apparatus 410 of the second embodiment having a master cylinder 412 and an actuating cylinder 414 which together constitute two distinct subassemblies or housings of the overall apparatus 410. The overall apparatus 410 of the second embodiment is constructed nearly identically to the overall apparatus 10 of the first embodiment except for specific modifications to the master cylinder 412 which will be delineated below.

Similar to the first embodiment, the master cylinder 412 of the second embodiment has a front manifold 416, a center manifold 418, and an annular manifold member 472 which are in spaced-apart, axially-aligned relationship to one another. Cylindrically-shaped front and rear sleeves 422 and 424 are positioned between the front and center manifold 416 and 418, and the center manifold and annular manifold member 418 and 472, respectively. The front and rear sleeves 422 and 424 form a front bore 506 and a rear bore 534, respectively. Within the rear bore 534 there is provided a retaining ring 538 within an internal groove 540 which is positioned approximately midway between the annular manifold member 472 and the center manifold 418. The retaining ring 538 is of sufficient strength to act as a piston stop in a manner to be described later.

The annular manifold member 472 has an elongated annular portion 473 with an outer cylindrical surface 528 extending towards the center manifold 418. The interior surface of the elongated annular portion 473 provides a reduced diameter bore 478. An end cap 420 is in part mounted to the annular manifold member 472 on a side opposite the elongated annular portion 473. The end cap 420 has a bore 568 that is in communication with the reduced diameter bore 478 of the annular manifold member 472. As with the first embodiment, the second embodiment has an intensifier piston 504 which is attached to an intensifier piston rod 510 and is positioned within the front bore 506. The intensifier piston 504 divides the front bore 506 into a first chamber 556 adjacent the front manifold 416, and a second chamber 562 adjacent the center manifold 418. The first chamber 556 is in fluidic communication with a port 560 in the front manifold 416. The second chamber 562 is in fluidic communication with a port 564 within the center manifold 418. The intensifier piston rod 510 passes through a bore 520 located in the center manifold 418 and extends short of the reduced diameter bore 478 of the annular manifold member 472.

Similar to the first embodiment, a floating reservoir piston 532 of the second embodiment is positioned over the intensifier piston rod 510 within the rear bore 534. The floating reservoir piston 532 divides the rear bore 534 into a third chamber 554 adjacent the center manifold 418, and a fourth chamber 552 adjacent the annular manifold member 472. The third chamber 554 is in fluidic communication with a port 436 in the center manifold 418. The fourth chamber 552 is in fluidic communication with the reduced diameter bore 478 of the annular manifold member 472 and the bore 568 of the end cap 420. The end cap 420 also is provided with a supply port 490 which is in fluidic communication with the rear bore 534 through a supply passage 482 in the annular manifold member 472.

In contrast to the first embodiment, the floating reservoir piston 532 is truncated and does not mate with the cylindrical surface 528 of the annular manifold member 472. Instead, the floating reservoir piston 532 is retained within the rear bore 534 between the center manifold 418 and the retaining ring 538.

In addition, in the second embodiment a retract piston 536 which is positioned over the outer cylindrical surface 528 of the annular manifold member 472 is provided. The retract piston 536 defines a retract chamber 553 within the rear bore 534 between the annular manifold member 472 and the retract piston 536. The retract piston 536 operates between the annular manifold member 472 and the retaining ring 538 such that the retract piston 536 always remains piloted upon the outer cylindrical surface 528 of the annular manifold member 472. Further, the retract piston 536 is constructed such that it cannot interrupt the fluidic path between the fourth chamber 552 and the reduced diameter bore 478. The retract chamber 553 is in communication with the supply port 490 via the supply passage 482 for purposes of actuating the retract piston 536.

Similar to the first embodiment, a proximity sensor 652 is provided for sensing the position of the floating reservoir piston 532 in relation to the retaining ring 538. The proximity sensor 652 serves to warn an operator that the quantity of hydraulic fluid within the fourth chamber 552 is low and needs replenishing. The hydraulic fluid is introduced into the fourth chamber 552 through a fill port 542 positioned in proximity to the retaining ring 538.

The actuating cylinder 414 is constructed identically to the actuating cylinder 14 of the first embodiment. As shown, the actuating cylinder 414 is mounted to the end cap 420, but as noted with the first embodiment, the actuating cylinder 414 can be fluidically connected to the end cap 420 with a suitable fluidic connection. The rear portion of the actuating cylinder 414 has a bore 576 that is in fluidic communication with the bore 568 of the end cap 420. A rear piston 584 is positioned within the bore 576. The rear piston 584 is attached to a piston rod 446 which extends from the rear piston 584 through the entire axial extent to the right, where it exits the actuating cylinder 414 as an unencumbered cantilevered end 598.

The rear piston 584 divides the bore 576 into a fifth and sixth chamber 631 and 636, respectively. The sixth chamber 636 is in communication with the fourth chamber 552 of the master cylinder 412 via the passage 568 in the end cap 420 and the reduced diameter bore 478 in the annular manifold member 472.

Figure 13A:
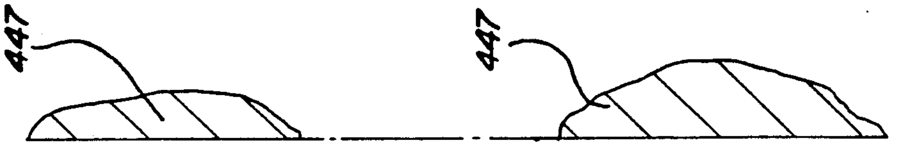
FIG. 13A is a cross-sectional view of the second embodiment that shows the position of the pistons and piston rods in the fully retracted position.
Figure 13A:
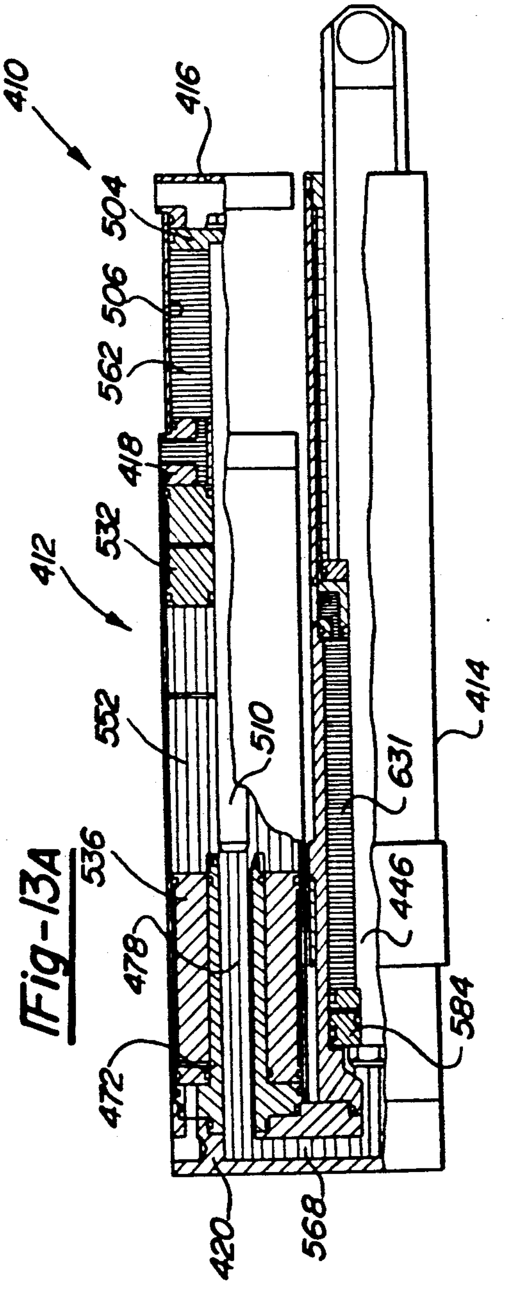

Operation of the second embodiment is nearly identical to the first embodiment except for the ability of the force intensification apparatus 410 to reach an intermediate retract position from either the fully retracted or fully extended position. FIG. 13A is a cross-sectional view that shows the position of the pistons and piston rods when the overall apparatus 410 is in the fully retracted position. At the commencement of a cycle, the intensifier piston 504 is held to the extreme right end of the front bore 506 by high pressure air in the second chamber 562, as shown. Consequently, the end of the intensifier piston rod 510 is retracted to a position outside of the reduced diameter bore 478 permitting the fourth chamber 552 to communicate with the reduced diameter bore 478. The floating reservoir piston 532 is to the extreme right end of its travel against the center manifold 418. The retract piston 536 is to the extreme left end of its travel against the annular manifold member 472.

In the actuating cylinder 414, the rear piston 584 is held by high pressure air to the extreme left toward the end cap 420 defining the greatest extent of the fifth chamber 631. Therefore, the extreme right free end of the piston rod 446 is almost entirely retracted within the confinement of the actuating cylinder 414.

Figure 13B:
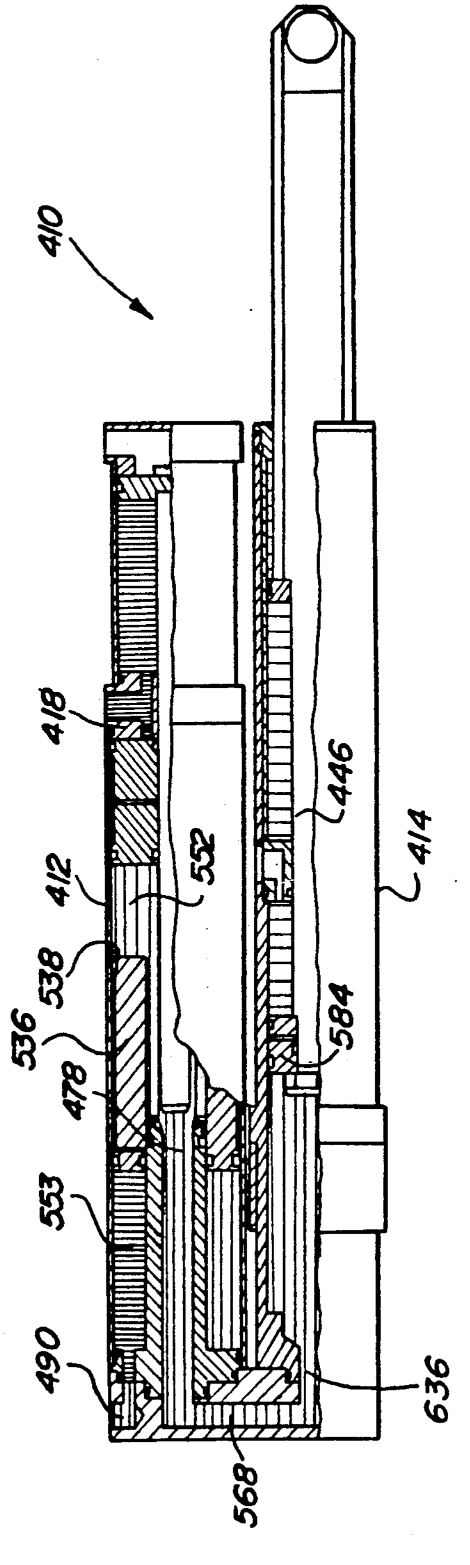
FIG. 13B is a cross-sectional view similar to that shown in FIG. 13A showing the position of the pistons and piston rods after pressure has been applied to the retracted piston.

FIG. 13B is a cross-sectional view that shows the position of the pistons and piston rods after the overall apparatus 410 has been actuated to the intermediate retract position at the start of a work cycle. Air pressure is introduced into the retract chamber 553 through the supply port 490, causing the retract piston 536 to move toward the center manifold 418 until it abuts against the retaining ring 538. A volume of oil corresponding to the volume displaced by the retract piston 536 exits the fourth chamber 552 and travels via the reduced diameter bore 478 and the bore 568 to the sixth chamber 636. The increase in volume of oil in the sixth chamber 636 causes the rear piston 584 to move rapidly to the right. Consequently, there is a rapid deployment of the piston rod 446 to the right where its travel is arrested a predetermined distance from a workpiece 447, serving as an intermediate retract position for the overall apparatus 410. The predetermined distance traveled by the piston rod 446 is determined directly by the volume of oil displaced by the retract piston 536.

Figures 13C, 13D:
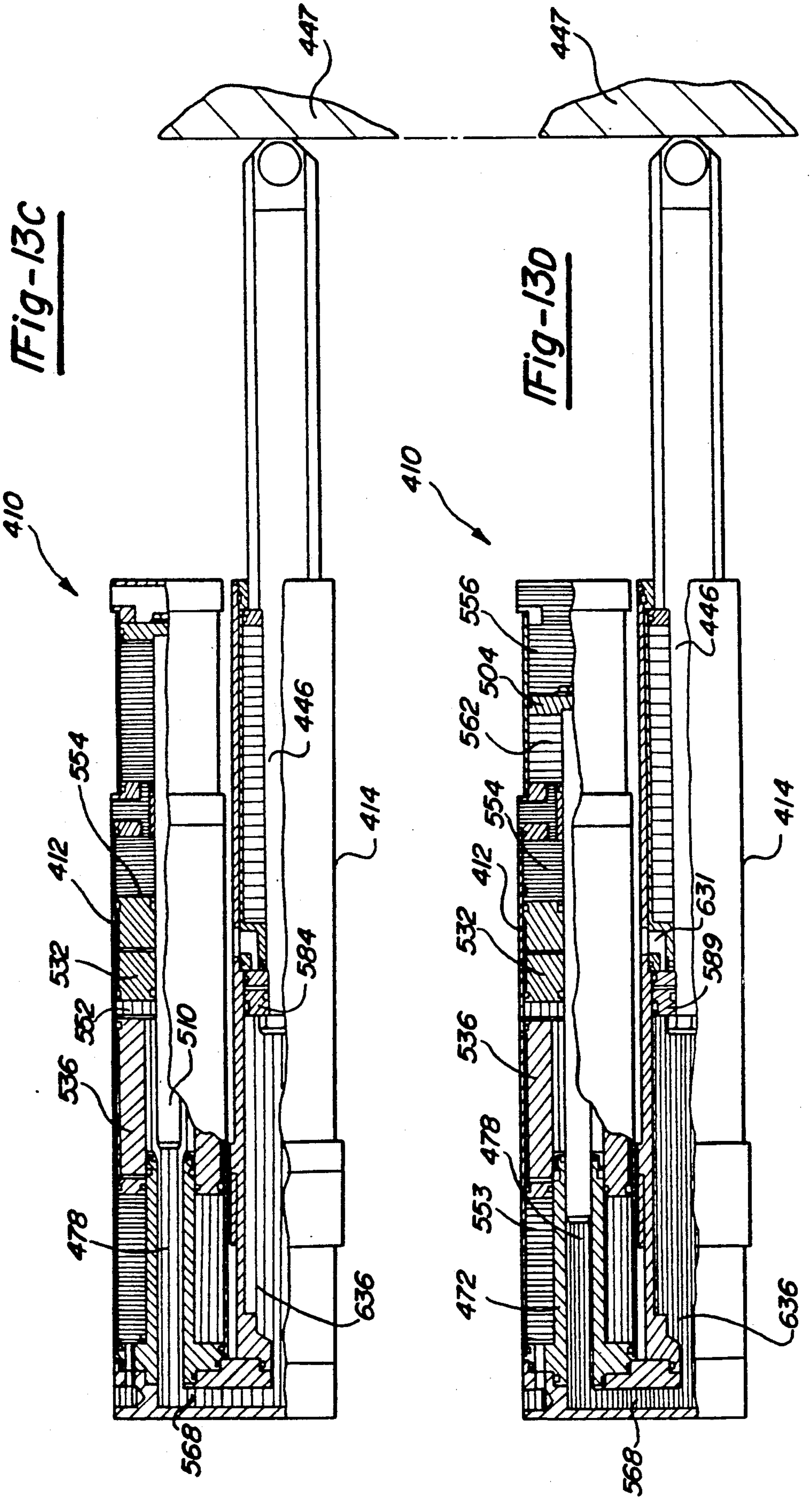
FIG. 13C is a cross-sectional view similar to that shown in FIG. 13A and 13B showing the position of the pistons and piston rods after pressure has been applied to the reservoir piston.
FIG. 13D is a cross-sectional view similar to that shown in FIGS. 13A, 13B and 13C except that intensification has occurred.

FIG. 13C is a cross-sectional view that shows the position of the pistons and piston rods after the overall apparatus 410 has been actuated to engage the workpiece 447. FIG. 13C corresponds to FIG. 8B of the first embodiment, and the operation of the overall apparatus 410 corresponds accordingly. Air pressure is introduced to the third chamber 554 causing the floating reservoir piston 532 to move to the left toward the retract piston 536. An additional volume of oil corresponding to the volume displaced by the floating reservoir piston 532 exits the fourth chamber 552 and travels via the reduced diameter bore 478 and the bore 568 into the sixth chamber 636, further causing the rear piston 584 to move rapidly to the right. The piston rod 446 consequently moves rapidly to the right where its travel is halted by its interception with the workpiece 447.

FIG. 13D is a cross-sectional view corresponding to FIG. 8C of the first embodiment, showing the final stage of the work cycle of the overall apparatus 410. For achieving force intensification at the piston rod 446, air pressure is introduced into the first chamber 556 to the right of the intensifier piston 504. As the intensifier piston 504 moves to the left, the tip of the intensifier piston rod 510 enters the reduced diameter bore 478 in the annular manifold member 472, causing the oil trapped before it to act as a closed system between the intensifier piston rod 510, the reduced diameter bore 478, the bore 568 and the sixth chamber 636. The continued travel of the intensifier piston rod 510 into the reduced diameter bore 478 acts on the oil in the sixth chamber 636 urging the rear piston 584 to the right, delivering a greatly increased or intensified force to the piston rod 446.

According to the second embodiment of the present invention, the overall apparatus 410 does not automatically return to the fully retracted position shown in FIG. 13A, but returns to the intermediate retract position shown in 13B for purposes of facilitating rapid successive weld operations. To return the overall apparatus 410 to the intermediate retract position from the intensified position, air pressure is released from the first chamber 556 and re-introduced in the second chamber 562 to drive the intensifier piston 504 back to its original position. Consequently, the intensifier piston rod 510 is withdrawn from the reduced diameter bore 478, simultaneously reducing the pressure against the rear piston 584 in the sixth chamber 636. The floating reservoir piston 532 is driven back to its original position by the partial return stroke of the rear piston 584 in cooperation with the releasing of the high pressure air from the third chamber 554 which had originally moved and held the floating reservoir piston 532 in its actuated position. The rear piston 584 and, therefore, the piston rod 446, is retracted to the intermediate retract position upon the floating reservoir piston 532 being returned to its original position. The rear piston 584 and the piston rod 446 retract no further because of the volume of oil yet displaced by the retract piston 536.

At the end of a multiple weld operation, the operation of the overall apparatus 410 is again similar to the overall apparatus 10 of the first embodiment. From the intermediate retract position, air pressure is re-introduced into the fifth chamber 631, driving the rear piston 584 back to its original position. Upon release of the high pressure air in the retract chamber 553 which had originally moved and held the retract piston 536 in its actuated position, the retract piston 536 is returned to its original position adjacent the annular manifold 472 by the return stroke of the rear piston 584.

From the above, it can be appreciated that rapid successive weld operations can be accomplished more quickly by eliminating the first embodiment's requirement for a complete retraction of the piston rod 446 between weld operations. The overall apparatus 410 under the second embodiment can rapidly perform a successive number of weld operations by first extending to the intermediate retract position (FIG. 13B), further extending to the weld position (FIG. 13C), intensifying during the weld operation (FIG. 13D), partially retracting to the intermediate retract position (FIG. 13B) which is designed to sufficiently clear the workpiece 447, and then return to the weld position (FIG. 13D) for an additional intensification and weld operation. When the desired series of weld operations is completed, the overall apparatus can then be cycled directly from the intermediate retract position (FIG. 13B) to the full retract position (FIG. 13A) for purposes of providing maximum clearance with the workpiece 447.

A fluid control system for the second embodiment of the present invention would be analogous to the schematic fluid diagram of the first embodiment illustrated in FIG. 11. Those with ordinary skill in the art can readily recognize the minor modifications necessary to accommodate the operational requirements of the retract piston 536. By example, a solenoid-operated valve can be employed to operate the retract piston 536 between its "stowed" position when the piston rod 446 is fully retracted, and its "deployed" position when the piston rod 446 is at the intermediate retract, weld and intensified positions. In addition, the three-way valve mechanism 274 of the first embodiment can be modified to provide a valve position in which both lines 282 and 278 are exhausted to the exhaust port 286 when the overall apparatus is in the intermediate retract position.

While the illustrative embodiments of the invention have been described in considerable detail for the purpose of setting forth practical operative structures whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. An apparatus for intensifying a force that is applied to a tool to move said tool into and out of engagement with a workpiece, said apparatus comprising:

- a master cylinder having a first manifold, a second manifold adjacent said first manifold and a third manifold spaced relative said first and second manifolds, said first, second and third manifolds each having at least one aperture therein, said first, second and third manifolds being axially aligned and in spaced apart relationship to one another;
- means for forming a first cavity between said first and second manifolds;
- means for forming a second cavity between said second and third manifolds;
- an intensifier piston positioned in said first cavity, said intensifier piston defining first and second chambers in said first cavity;
- a reservoir piston positioned in said second cavity, said reservoir piston defining third and fourth chambers in said second cavity, said reservoir piston having a central bore therein;
- an intensifier rod coupled to said intensifier piston, said intensifier rod passing through said at least one aperture in said second manifold and said central bore of said reservoir piston;
- an actuating cylinder positioned in spaced relationship with respect to said master cylinder;
- means for forming a third cavity within said actuating cylinder;
- a piston positioned in said third cavity of said actuating cylinder, said piston defining fifth and sixth chambers on each side of said piston; said fourth chamber adjacent said reservoir piston and said sixth chamber adjacent said piston each containing hydraulic fluid;
- passage means for placing said fourth and sixth chambers in fluid communication with each other, said passage means having one end juxtaposed said master cylinder and an opposite end attached to said actuating cylinder;

a piston rod attached to said piston, said piston rod having a free end cantilevered from said actuating cylinder;

means located in said second manifold for introducing pressurized fluid to said third chamber adjacent said reservoir piston to cause said reservoir piston to force hydraulic fluid from said reservoir piston fourth chamber into said actuating cylinder sixth chamber that is adjacent to said piston, such that said piston and said attached piston rod advances at a first predetermined rate toward said workpiece, said means for introducing pressurized fluid to said third chamber further comprising at least one port passage complementary with said one of said at least one aperture of said second manifold to provide ingress of pneumatic fluid to pressurize said third chamber adjacent said reservoir piston; and means for introducing pressurized pneumatic fluid to said first chamber adjacent said intensifier piston to cause said intensifier piston to move and further to move said coupled intensifier rod into said at least one aperture of said third manifold to act on said hydraulic fluid therein such that said hydraulic fluid is intensified for introduction to said actuating cylinder sixth chamber to cause said piston rod attached to said piston to advance at a second predetermined rate toward said workpiece.

2. The apparatus of claim 1 wherein said means for forming said first and second cavities is hollow thin walled cylinders.

3. The apparatus of claim 1 wherein said passage means further comprises an end cap positioned adjacent said third manifold, said end cap having a passage therein, said passage having one end complementary with said at least one aperture of said third manifold and at least one opposite end in spaced relation to said actuating cylinder sixth chamber to communicate fluid between said fourth and sixth chambers.

4. The apparatus of claim 1, wherein said first manifold further comprises a port fitting complementary with said at least one aperture to provide ingress for pneumatic fluid to pressurize said first chamber adjacent said intensifier piston.

5. The apparatus of claim 1 wherein said second manifold further comprises at least one port fitting complementary with said at least one aperture to provide ingress for pneumatic fluid to pressurize said second chamber adjacent said intensifier piston.

6. The apparatus of claim 1 wherein said passage means further comprises an end cap contiguous to said third manifold, said end cap having a bore communicating with said at least one aperture in said third manifold.

7. The apparatus of claim 1 further comprising second passage means for supplying hydraulic fluid to said master cylinder.

8. An apparatus for intensifying a force that is applied to a tool to move said tool first rapidly, then slowly toward a workpiece, said apparatus comprising;

a master cylinder having a first manifold, a second manifold adjacent said first manifold and a third manifold spaced relative to said first and second manifolds, said first, second and third manifolds each having at least one aperture therein, said first, second and third manifolds being axially aligned and in spaced apart relationship to one another;

a first cylindrical sleeve attached to said first and said second manifolds to form a first cavity therebetween;

a second cylindrical sleeve attached to said second and said third manifolds to form a second cavity therebetween;

an intensifier piston positioned in said first cavity, said intensifier piston defining first and second chambers in said first cavity;

a reservoir piston positioned in said second cavity, said reservoir piston defining third and fourth chambers in said second cavity, said reservoir piston having a central bore therein;

an intensifier rod coupled to said intensifier piston, said intensifier rod passing through said at least one aperture in said second manifold and said central bore of said reservoir piston;

an actuating cylinder having an internal space therein positioned in spaced relationship with respect to said master cylinder;

an apertured sleeve positioned within said actuating cylinder and bisecting said internal space within said actuating cylinder into third and fourth cavities;

a first actuating piston positioned in said third cavity of said actuating cylinder, said first actuating piston defining fifth and sixth chambers therein, said fourth chamber adjacent to said reservoir piston and said sixth chamber adjacent said first actuating piston each having hydraulic fluid passage means for placing said fourth and sixth chambers in fluid communication with one another to form a closed hydraulic system, said hydraulic fluid passage means having one end juxtaposed to said third manifold and an opposite end attached to said actuating cylinder;

a second actuating piston positioned in said fourth cavity of said actuating cylinder, said second actuating piston defining seventh and eight chambers therein;

a piston rod attached to said first actuating piston, said piston rod passing through said apertured sleeve;

said piston rod further being attached to said second actuating piston, said piston rod also being cantilevered from said actuating cylinder;

means located in said second manifold for introducing pressurized pneumatic fluid to said third chamber adjacent said reservoir piston to cause said reservoir piston to force hydraulic fluid from said reservoir piston fourth chamber into said actuating cylinder sixth chamber that is adjacent to said first actuating piston, such that said first actuating piston and said attached piston rod advances at a first predetermined rate toward said workpiece; and means for introducing pressurized pneumatic fluid to said first chamber adjacent said intensifier piston to cause said intensifier piston to move in association with said coupled intensifier rod into said at least one aperture of said third manifold and act on said hydraulic fluid such that said hydraulic fluid is intensified for introduction to said actuating cylinder sixth chamber that is adjacent said first actuating piston to cause said piston rod attached to said first actuating piston to advance at a second predetermined rate toward said workpiece.

9. The apparatus of claim 8 wherein said second actuating piston is formed as an integral part of said piston rod.

10. The apparatus of claim 8 further comprising fluid ingress means positioned in an outer wall of said actuating cylinder, said fluid ingress means providing communication between said fifth chamber adjacent said first actuating piston, said seventh chamber adjacent said second actuating piston, and said eighth chamber adjacent said second actuating piston.

11. The apparatus of claim 8 wherein a portion of said hydraulic fluid passage means of said sixth chamber is fabricated from a flexible nonmetallic material.

12. The apparatus of claim 8 wherein said hydraulic fluid passage means of said fourth chamber further comprises an end cap positioned adjacent said third manifold and said actuating cylinder, said end cap having a passage therein, said passage having one end complementary with said at least one aperture of said third manifold and an opposite end communicating with said hydraulic fluid passage means of said sixth chamber.

13. The apparatus of claim 8 further comprising an annular retainer surrounding a portion of the axial extent of said piston rod and mounted to said actuating cylinder in abutting relationship therewith.

14. The apparatus of claim 13 wherein said actuating cylinder is coupled to said master cylinder.

15. The apparatus of claim 14 wherein said portion of said piston rod with said eighth chamber forward of said second actuating piston and within said annular retainer is noncircular in configuration.

16. The apparatus of claim 12 wherein said end cap, said first manifold and said third manifold are biased toward said second manifold by a plurality of tension studs, whereby said first and second cylindrical sleeves are positioned against said first, second and third manifolds and said end cap to form said master cylinder.

17. The apparatus of claim 8 further comprising hydraulic ingress means, said hydraulic ingress means being provided for replenishing said hydraulic fluid in said closed hydraulic system.

18. An apparatus for intensifying a force that is applied to a tool to move said tool first rapidly, then slowly towards a workpiece, said apparatus comprising:

a master cylinder having a first manifold, a second manifold and a third manifold spaced relative to said first and second manifolds, said first, second and third manifolds each having at least one aperture therein, said first, second and third manifolds being axially aligned and in spaced apart relationship to one another;

a first cylindrical sleeve having a cylindrical bore, said first cylindrical sleeve being attached to said first and second manifolds to form a first cavity therebetween;

a second cylindrical sleeve having a cylindrical bore, said second cylindrical sleeve being attached to said second and said third manifolds to form a second cavity therebetween;

an intensifier piston positioned in said first cavity, said intensifier piston defining first and second chambers in said first cavity;

a reservoir piston positioned in said second cavity, said reservoir piston defining third and fourth chambers in said second cavity, said reservoir piston having a central bore therein;

an intensifier rod coupled to said intensifier piston, said intensifier rod passing through said at least one aperture in said second manifold and said central bore of said reservoir piston;

said reservoir piston being adapted for sliding motion along a portion of the axial extent of said intensifier rod, said reservoir piston moving in a direction away from said intensifier piston during its power stroke;

an end cap with at least one aperture therein, said end cap being juxtaposed said third manifold, said end cap further having passage means therein;

a plurality of tension studs passing through said first manifold, second manifold and said end cap of bias said first, second and third manifolds against said first and second cylindrical sleeves;

a bore disposed within said third manifold, said bore having one end in communication with said fourth chamber adjacent said reservoir piston and an opposite end in communication with said at least one aperture in said end cap;

an actuating cylinder having an internal space therein positioned in spaced relationship with respect to said master cylinder;

an apertured sleeve positioned within said actuating cylinder and bisecting said internal space within said actuating cylinder into third and fourth cavities;

a first actuating piston positioned in said third cavity of said actuating cylinder, said first actuating piston defining fifth and sixth chambers therein; said fourth chamber adjacent said reservoir piston, said sixth chamber adjacent said first actuating piston and said passage means of said end cap each containing hydraulic fluid and communicating with one another;

a second actuating piston positioned in said fourth cavity of said actuating cylinder, said second actuating piston defining seventh and eighth chambers therein;

a piston rod attached to said first actuating piston, said piston rod passing through said apertured sleeve;

said piston rod further being formed as an integral part of said second actuating piston, said piston rod further being cantilevered from the end of said actuating cylinder;

pneumatic fluid ingress means within said second manifold for introducing pressurized pneumatic fluid to said third chamber adjacent said reservoir piston to cause said reservoir piston to force hydraulic fluid from said fourth chamber into said actuating cylinder sixth chamber that is adjacent to said first actuating piston, such that said first actuating piston and said attached piston rod advances at a first predetermined rate toward said workpiece; and pneumatic fluid ingress means positioned in said first manifold for introducing pressurized pneumatic fluid to said first chamber adjacent said intensifier piston to cause said intensifier piston to move and further to move said attached intensifier rod into said at least one aperture of said third manifold and act on said hydraulic fluid such that said hydraulic fluid is intensified for introduction to said actuating cylinder sixth chamber that is adjacent said first actuating piston to cause said piston rod attached to said first actuating piston to advance at a second predetermined rate toward a workpiece.

19. The apparatus of claim 18 further comprising a one-way check valve mounted in another of said at least one aperture of said end cap such that hydraulic fluid may be added to said fourth chamber.

20. The apparatus of claim 18 further comprising fluid ingress in the form of bore containing fitments positioned in an outer wall of said actuating cylinders, said bore containing fitments providing communication between said fifth chamber adjacent said first actuating piston, said seventh chamber adjacent said second actuating piston, and said eighth chamber adjacent said second actuating piston.

21. The apparatus of claim 18 further comprising a piston rod adapter telescoped over one end of said piston rod, said piston rod adapter being adapted for axial movement with respect to said piston rod.

22. The apparatus of claim 21 further comprising a spring interposed between said piston rod and said piston rod adapter.

23. The apparatus of claim 22 further comprising a load cell contained within said piston rod adapter, said load cell being biased by said piston rod.

24. The apparatus of claim 23 wherein said piston rod adapter has a radially aligned bore for egress of an electrical connection to said load cell.

25. The apparatus of claim 23 wherein said spring is positioned between said piston rod and said load cell.

26. The apparatus of claim 1 further comprising means for determining the position of said workpiece, said means for determining being mounted to said master cylinder located adjacent said free end of said piston rod.

27. The apparatus of claim 1 further comprising means for monitoring said intensified force applied to said tool to move said tool into and out of engagement with said workpiece, said means for monitoring being located adjacent said free end of said piston rod.

28. The apparatus of claim 26 wherein said means for determining the position of said workpiece comprises a load cell located adjacent said free end of said piston rod, said load cell being biased by said piston rod.

29. The apparatus of claim 28 further comprising a piston rod adapter mounted to said piston rod, said piston rod adapter having a radially aligned bore for egress of an electrical connection to said load cell.

30. The apparatus of claim 27 wherein said means for monitoring said intensified force comprises a load cell located adjacent said free end of said piston rod, said load cell being biased by said piston rod.

31. The apparatus of claim 30 further comprising a piston rod adapter mounted to said piston rod, said piston rod adapter having a radially aligned bore for egress of an electrical connection to said load cell.

32. The apparatus of claim 1 further comprising means for sensing the position of said reservoir piston in proximity to said end cap.

33. A method for applying an intensified force to a workpiece, said method comprising the steps of:

applying a fluid pressure to one side of a reservoir piston located in a master cylinder having a central axis to move said reservoir piston along said master cylinder from a first predetermined position in a first predetermined direction to effect movement of a piston and its associated piston rod located in an actuator cylinder remotely positioned from said master cylinder from a first predetermined position in a direction towards said workpiece whereby a first predetermined force is applied to said workpiece;

concurrently with applying said fluid pressure to one side of said reservoir piston applying a fluid pressure to one side of an intensifier piston axially aligned with said central axis of said master cylinder to positively constrain said intensifier piston in a first predetermined position from movement;

concurrently applying a fluid pressure to the other side of said intensifier piston and relieving said fluid pressure applied to said one side of said intensifier piston to move said intensifier piston and its associated piston rod in said first predetermined direction to intensify said first predetermined force applied to said workpiece; and relieving said fluid pressure applied to said one side of said reservoir piston and simultaneously applying a fluid pressure to a side of said piston most distal from said master cylinder and said one side of said intensifier piston to return said intensifier piston, said reservoir piston and said piston in said actuating cylinder to said first predetermined position.

34. The apparatus of claim 1 further comprising:

a retract piston positioned in said second cavity, said retract piston further defining a retract chamber in said second cavity; and means for introducing pressurized fluid to said retract chamber adjacent said retract piston to cause said retract piston to force hydraulic fluid from said reservoir piston fourth chamber into said actuating cylinder sixth chamber that is adjacent to said piston, such that said piston and said attached piston rod advance a predetermined distance toward said workpiece.

35. The apparatus of claim 8 further comprising:

a retract piston positioned in said second cavity, said retract piston further defining a retract chamber in said second cavity; and means for introducing pressurized pneumatic fluid to said retract chamber adjacent said retract piston to cause said retract piston to force hydraulic fluid from said reservoir piston fourth chamber into said actuating cylinder sixth chamber that is adjacent to said first actuating piston, such that said first actuating piston and said attached piston rod advance a predetermined distance toward said workpiece.

36. The apparatus of claim 18 further comprising:

a retract piston positioned in said second cavity, said retract piston further defining a retract chamber in said second cavity;

retaining means interposed between said retract piston and said reservoir piston, said retaining means providing an abutment for said retract piston such that said retract piston has a limited stroke when moving to force hydraulic fluid from said fourth chamber into said actuating cylinder sixth chamber that is adjacent to said first actuating piston; and pneumatic fluid ingress means within said third manifold for introducing pressurized pneumatic fluid to said retract chamber adjacent said retract piston to cause said retract piston to force hydraulic fluid from said fourth chamber into said actuating cylinder sixth chamber that is adjacent to said first actuating piston, such that said first actuating piston and said attached piston rod advance a predetermined distance toward said workpiece.

* * * * *

UNITED STATES PATENT AND TRADEMARK OFFICE
CERTIFICATE OF CORRECTION

PATENT NO. : 5,107,681

DATED : April 28, 1992

INVENTOR(S) : Michael H. Wolfbauer, III

It is certified that error appears in the above-identified patent and that said Letters Patent is hereby corrected as shown below:

Title page under ABSTRACT, line 2, after "carrying" insert ---- piston ----.

Column 19, line 24, delete "with" and insert ---- within ----.

Column 20, line 7, delete "of" and insert ---- to ----.

Signed and Sealed this

Sixth Day of July, 1993

Attest:

MICHAEL K. KIRK

Attesting Officer

Acting Commissioner of Patents and Trademarks